United States Patent [19]

Queinnec

[11] Patent Number: 5,602,600
[45] Date of Patent: Feb. 11, 1997

[54] DEVICE FOR TRANSPARENTLY DISPLAYING CHARACTERS IN A VIDEO SYSTEM BY FORMING A WEIGHTED AVERAGE OF A VIDEO SIGNAL AND THE VIDEO SIGNAL AFTER TEXT HAS BEEN INSERTED

[75] Inventor: Olivier Queinnec, Grenoble, France

[73] Assignee: Thomson Consumer Electronics, Courbevoie, France

[21] Appl. No.: 643,585

[22] Filed: May 6, 1996

Related U.S. Application Data

[63] Continuation of Ser. No. 331,548, filed as PCT/FR94/00238, Mar. 4, 1994 published as WO94/21080, Sep. 15, 1994.

[30] Foreign Application Priority Data

Mar. 12, 1993 [FR] France .................................. 93 02869

[51] Int. Cl.[6] .............................. H04N 9/76; H04N 5/265
[52] U.S. Cl. ........................................... 348/589; 348/600
[58] Field of Search .................................. 348/589, 600, 348/584, 239, 599, 598; H04N 5/265, 9/76

[56]     References Cited

U.S. PATENT DOCUMENTS

| 3,604,849 | 9/1971 | Skrydstrup | 348/588 |
|---|---|---|---|
| 3,898,377 | 8/1975 | Fairbairn et al. | 348/589 |
| 4,591,897 | 5/1986 | Edelson | 348/589 |
| 4,675,737 | 6/1987 | Fujino et al. | 348/589 |
| 4,680,622 | 7/1987 | Barnes et al. | 348/600 |
| 4,812,909 | 3/1989 | Yokobayashi et al. | 348/589 |
| 4,908,699 | 3/1990 | Chaplin et al. | 348/599 |
| 5,128,765 | 7/1992 | Dingwall et al. | 358/182 |

FOREIGN PATENT DOCUMENTS

| 0342803 | 11/1989 | European Pat. Off. | H04N 5/92 |
|---|---|---|---|
| 0449106 | 10/1991 | European Pat. Off. | H04N 5/445 |
| 1166694 | 6/1989 | Japan | H04N 5/445 |
| 0806910 | 11/1986 | WIPO | H04N 5/445 |
| 9421080 | 9/1994 | WIPO | H04N 5/445 |

OTHER PUBLICATIONS

Webster, William M., "Simultaneous Television and Computer Image Display", Technical Notes, TN No.: 1374, mailed Apr. 24, 1986, pp. 1–2.

Primary Examiner—Victor R. Kostak
Attorney, Agent, or Firm—Oblon, Spivak, McClelland, Maier & Neustadt, P.C.

[57]         ABSTRACT

A device for displaying characters in a video system, the characters being able to be displayed transparently against a background consisting of the normal television image. The device inserts the text into the original video signal, then forms the weighted average of the signal including the text and the original video signal.

7 Claims, 2 Drawing Sheets

DEVICE FOR TRANSPARENTLY DISPLAYING CHARACTERS IN A VIDEO SYSTEM BY FORMING A WEIGHTED AVERAGE OF A VIDEO SIGNAL AND THE VIDEO SIGNAL AFTER TEXT HAS BEEN INSERTED

This application is a Continuation of application Ser. Nov. 08/331,548, filed on Nov. 14, 1994, now abandoned, and was filed as PCT Application No. PCT/FR94/00238 on Mar. 4, 1994, published as WO94/21080, Sep. 15, 1994.

BACKGROUND OF THE INVENTION

1. Field of the Invention

The present invention relates to a device for inserting characters in a video signal, the characters being able to be displayed transparently against a background consisting of the normal television image. The invention is particularly advantageous when the analog video signal corresponding to the background image is coded according to a standard dictating that the chrominance information be frequency modulated.

The invention relates to the field of television and its peripheral applications.

2. Description of the Related Art

Video appliances (video recorders, video laser disk players, decoders) increasingly rely on the display of text on the screen to facilitate exchange of information with the user. Such text may include programming menus, status messages, teletext, to mention but a few examples. For this purpose, the appliances comprise a character generator, the role of which is to insert the information corresponding to the text to be displayed into the video signal.

The text generation device as a whole then supplies either a RGB signal, or a signal coded according to a particular standard (for example PAL, NTSC, SECAM). Text insertion, for example into a composite video base band signal (called CVBS signal from now on) is done in a way known to the person skilled in the art, by multiplexing the CVBS signal with luminance plateaux corresponding to the characters to be displayed. Thus, at defined moments, the video information of the CVBS signal (luminance and chrominance) is replaced by different luminance information.

The introduction of the plateaux erases the colour information (chrominance) initially present. According to the PAL and NTSC standards, chrominance is amplitude modulated. During luminance plateaux due to the text, the amplitude of the chrominance signal is zero; the text on the screen is simply a more or less dark grey. In SECAM, the chrominance is frequency modulated. However, the luminance plateaux, generally high, introduce frequency variations into the CVBS signal. In consequence, numerous chrominance defects are seen to appear on the screen, defects which give rise to considerable problems in reading the text and/or in terms of visual comfort.

One known solution used to reduce the chrominance defects consists of sampling the chrominance information in the input CVBS signal, before the insertion of text, by virtue of a band pass filter targeted on the central frequency of the chrominance. This information is then reinjected into the video signal containing the inserted text. This practice is used in so-called "MIXED MODE" operating mode, one part of the screen including text, the other part the image. The text then takes the colour of the image. The luminance level of the text is chosen to be high in order to exhibit good visibility. This solution exhibits drawbacks. The amplitude of the chrominance information varies, in effect, both when text is present and when a part of the original CVBS signal is present, which can cause a degradation in the signal. Moreover, it is preferable, in multi-standard systems, to implement the bandpass filter only for a standard of the SECAM type, for which the chrominance is frequency modulated. That being so, a switch is provided at the pickoff point of the low-pass filter in order to put the latter out of service at the desired time. It is necessary, moreover, to provide logic for control of the switch, which should thus open when it is desired to display a text in the absence of any CVBS signal, or when the video signal is derived solely by the text generator, in order to prevent the CVBS signal disturbing the text. This latter mode is called "FULL-PAGE MODE". Moreover, the low-pass filter includes a capacitor and a choke, elements which are difficult to integrate.

The cost of this solution is therefore not inconsiderable.

In devices employing the usual character generators, the inserted text completely blanks the corresponding parts of the image. This can be troublesome, especially in the event that a menu for setting the image by remote control blanks out a large part of this image, or when it is desired to keep a text displayed while wishing to follow the normal program.

SUMMARY OF THE INVENTION

The object of the invention is to alleviate these drawbacks.

Provided is a device for displaying characters in a video system, characterized in that the device inserts the text into the original video signal and that it then forms a weighted average of the video signal comprising the text and of the original video signal.

That being so, in the resulting signal, the chrominance information is not obliterated, but simply attenuated. A bandpass filter is no longer necessary.

The luminance of the original image is also taken into account. It is also superimposed, attenuated, on the luminance information corresponding to the text. The result, on the screen, is an effect of transparency of the text; the viewer has the impression of seeing the original image through a milky or dark filter depending on the luminance of the text. It is therefore possible to follow a television program while having access to the displayed text.

Another advantage is that, outside the text areas, the signal is identical to the original signal.

Moreover, the device according to the invention is also used with standards not using frequency modulation to code the chrominance. It is thus possible to take advantage of the effect of the transparency in this case also.

According to one particular embodiment, the user has the choice between viewing the resultant weighted video signal or the video signal into which the text has been inserted. When the choice is on the latter signal, the resulting image presents the usual opaque text.

According to one particular embodiment, the weighted signal is used at least when the original video signal is a video base band signal, in which the chrominance is frequency modulated.

According to another particular embodiment, the weighting is performed by two resistors in series subjected to the voltage difference between the video signal with text and the original video signal, the signal present at the mid-point between the two resistors being the desired weighted signal. The use of resistors allows easier integration of the device.

BRIEF DESCRIPTION OF THE DRAWINGS

Other advantages and characteristics of the invention will emerge through the description of a particular embodiment, illustrated in a non-limiting way by the attached figures, among which.

DETAILED DESCRIPTION OF THE PREFERRED EMBODIMENTS

In the figures, the same elements bear the same references.

According to the embodiment represented, the input signal of the device is a composite video base band signal (called CVBS signal).

According to another embodiment, the input signal of the device is a luminance signal also comprising synchronization (called Y signal). A black-and-white television signal or a luminance signal of the SVHS standard are examples thereof.

Figure 1:
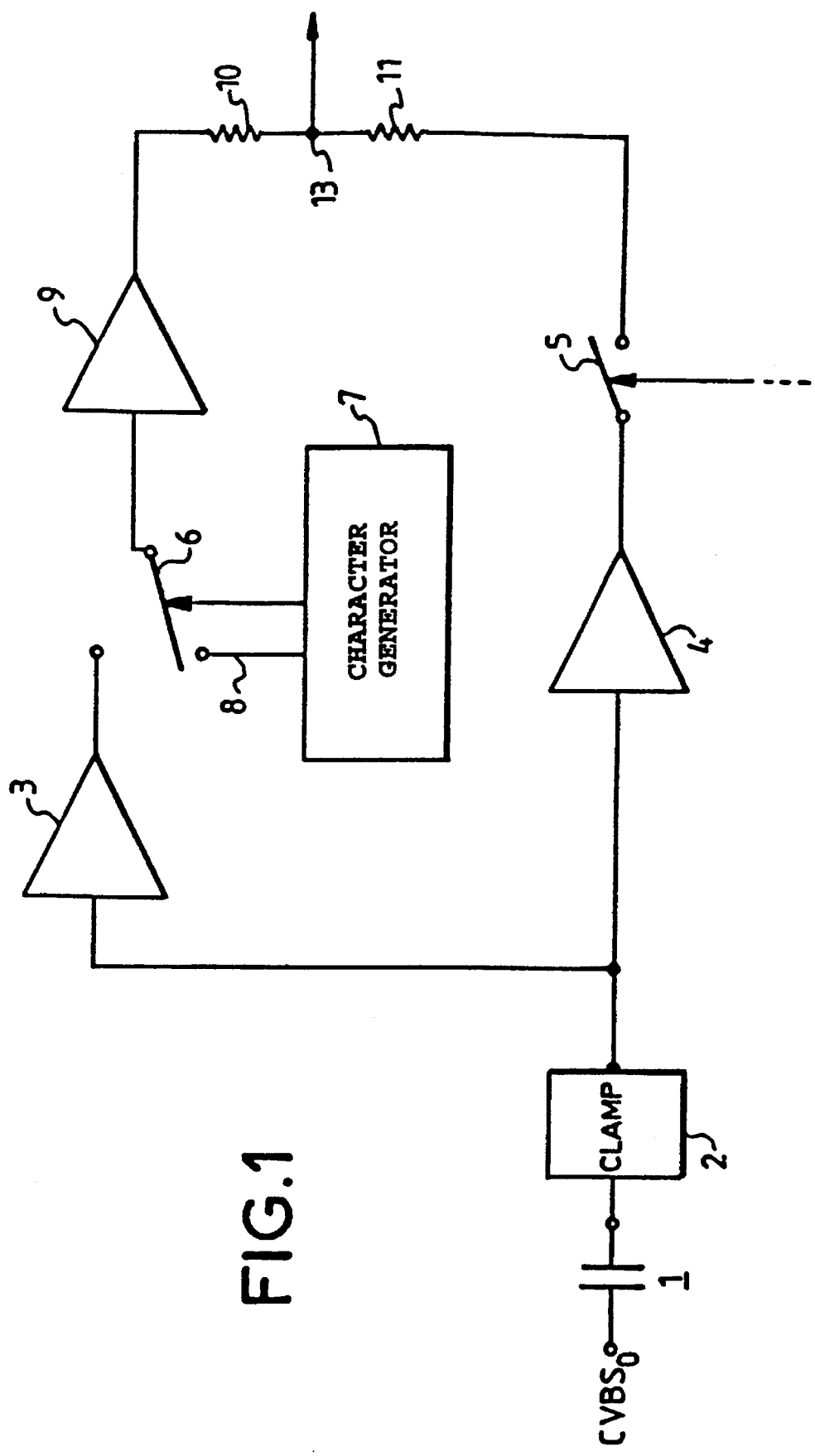
FIG. 1 represents a functional diagram of a device for displaying characters in accordance with the invention.

As illustrated in FIG. 1, the display device in accordance with the invention includes a clamping circuit 2, clamping the input signal (CVBS 0) to a reference voltage. The clamping circuit 2 works in conjunction with a clamping capacitor 1. The clamped signal is supplied in parallel to two output amplifiers (3 and 4) serving as impedance matching devices. The first circuit branch thus formed further includes, at the output of the amplifier 4, a "tri-state" control 5, driven by a circuit, not represented, the function of which will be described later. When it is desired to obtain a "transparent" text, the control 5 conducts normally and behaves as a closed switch.

The second circuit branch includes, after the amplifier 3, a switch 6 controlled by a character generator 7. The switch links the input of a matching amplifier 9 either to the output of the amplifier 3, or to a line 8 the voltage of which is controlled by the character generator 7. The output of the amplifier 9 is linked to one terminal of a resistor 10, the output of the control 5 is linked to one terminal of a resistor 11. The other two terminals of the resistors 10 and 11 are linked and form the output terminal 13 of the circuit.

The character generator 7 is synchronized to the line, frame and image-point (pixel) frequencies derived in a known way by a synchronization extractor and a phase-locked loop from the CVBS 0 signal. The character generator 7 includes, among other things, a RAM containing the text to be displayed, a ROM containing the matrices of the characters, as well as a horizontal and vertical time base circuit. The time base makes it possible to generate the necessary addresses for reading the RAM containing the text to be displayed (for example in ASCII code form). The character generator 7 also includes a luminance circuit, which derives a luminance signal from the matrices of characters supplied by the said ROM. This signal varies over time and includes luminance plateaux according to the type of insertion to be performed (character background or character shape for example). The luminance signal is present on the line 8. When insertion is to take place, the generator 7 activates the switch 6 by means of an insertion signal ("called Fast Blanking signal") so as to link the line 8 to the input of the amplifier 9. Thus, at the desired moment a part of the video signal is replaced by the luminance signal from the character generator 7.

The character generator 7 described above is given only by way of example. It is quite obvious that generators of a different construction may be employed. The problem of insertion of text per se into a video signal is known elsewhere and, for this reason, the operation of the character generator per se will not be further described. It should be noted, moreover, that the character generator 7 described above supplies only a luminance insertion signal. A character generator having the capability of generating colour text could obviously be envisaged.

If the signal present on the terminal of the resistor 10 linked to the amplifier 9 is denoted CVBS 1, and the signal present on the terminal of the resistor 11 linked to the control 5 is denoted CVBS 2, the signal CVBS 3, recovered at the terminal 13, is given by the relationship:

$$CVBS\,3 = \frac{R11 \times CVBS\,1 + R10 \times CVBS\,2}{R11 + R10}$$

in which R10 and R11 respectively represent the values of the resistors 10 and 11.

CVBS 3 is thus a weighted average of the signals CVBS 1 and CVBS 2. When no text is inserted into CVBS 1, there will be equality between the CVBS 1 and CVBS 2 signals, and the output signal, CVBS 3, will be equal to the clamped input signal CVBS; no alteration takes place.

In the presence of text, a weighted mean is formed between, on the one hand, the luminance corresponding to the text and the luminance and chrominance of the original CVBS signal. On the screen, this is manifested, on the one hand, by a transparency effect in the text, on the other hand by an attenuation of the chrominance defects generated by the insertion, the chrominance information not being eliminated, but simply attenuated.

When the control 5 is set to a high-impedance state, only the CVBS 1 signal arrives at the point 13. The situation is as if the resistance 11 were infinite. In consequence, there will be equality between CVBS 3 and CVBS 1. Inserted text will appear opaque on the screen, the underlying image being deleted.

According to a preferred embodiment, the control 5 conducts when the input signal CVBS 0 is a composite video signal, the chrominance information of which is frequency modulated. This is the case for a SECAM signal. For other types of signals, such as PAL and NTSC signals, it can be left to the user, via the remote control for the appliance comprising the device in accordance with the invention, to choose between text in opaque mode or in transparent mode.

According to one particular embodiment, the resistors 10 and 11 are such that:

$$\frac{R11}{R10} = 3$$

These values correspond to weighting coefficients of ¾ and ¼ respectively for the signal with opaque text and the original signal. This constitutes a good compromise between legibility of the text and transparency, when the luminance level of the characters is chosen close to white and the luminance level of the background to the characters is chosen to be close to black.

According to another particular embodiment, the ratio of the values of the resistors may be modified, especially depending on the standard of the coded video signal. This modification may be performed, for example, by tapping off the CVBS 1 signal to a resistor other than the resistor 10, but also connected to the point 13.

According to another particular embodiment, the weighting coefficients of ¾ and ¼ respectively for the signal with opaque text and the original signal are used in connection with the PAL and NTSC standards.

According to another particular embodiment, weighting coefficients of ⅔ and of ⅓ are used respectively for the signal with opaque text and the original signal in connection with the SECAM standard.

In the choice of the resistors, account will be taken of the luminance plateaux chosen for the text.

Figure 2:
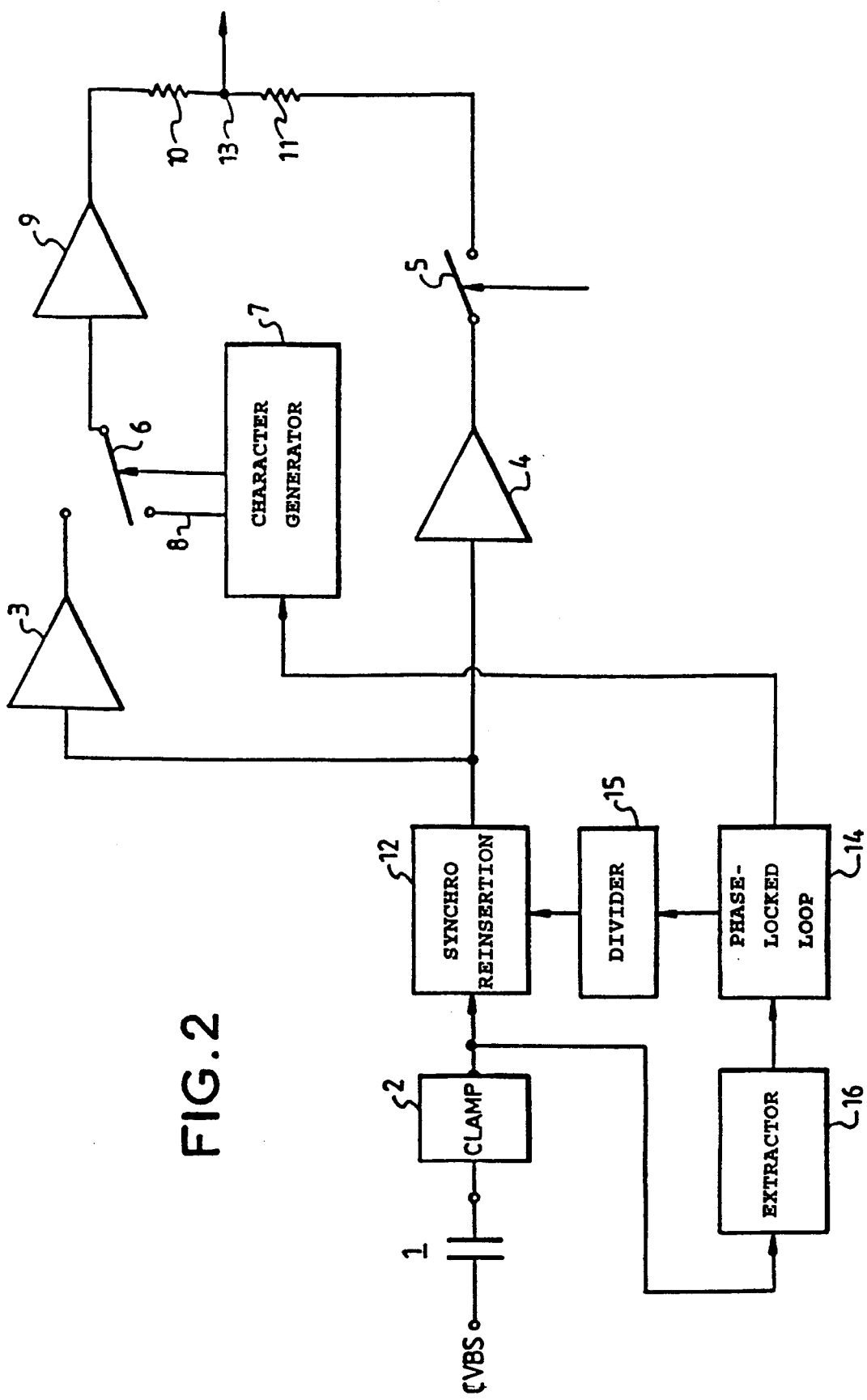
FIG. 2 represents a variant embodiment of the device of FIG. 1, comprising a synchronization reinsertion device.

According to another particular embodiment, the device in accordance with the invention includes synchronization reinsertion. This embodiment is illustrated in FIG. 2. A synchronization reinsertion circuit 12 is positioned between the clamp 2 and the amplifiers 3 and 4. This circuit 12, from a divider 15, receives a signal originating from the phase-locked loop 14 corresponding to the frequency of the line synchronization signals. The loop 14 receives the synchronization signal extracted from the input signal by an extractor 16.

Synchronization insertion 12 has the role of reinserting synchronization into the clamped video signal, from the clock originating from the phase-locked loop 14. This can be useful when the input signal exhibits synchronization pulses the phase of which varies ("jitter"). If reinsertion were not performed, "jitter" would appear between the synchronization signals controlling the character generator 7 and the synchronization signals of the clamped video signal, this having the result of deplorable vertical alignment of the lines of text.

The essential point is that the branching leading to the amplifiers 3 and 4 be placed after the reinsertion circuit so that, at the input to the resistors 10 and 11, the corresponding signals are properly in phase.

Finally, it is clearly understood that the invention is not limited to the examples of signals given.

I claim:

1. A device for displaying characters in a video system, said device comprising:

an input terminal for receiving an input video signal;

a clamping capacitor, connected to said input terminal, which receives said input video signal;

a clamping circuit which receives an output of said clamping capacitor and clamps said input video signal to a reference voltage;

a synchronization reinsertion circuit which receives the clamped input video signal from said clamping circuit an reinserts synchronization into the clamped input video signal;

a character generator for inserting text into said input video signal;

a selection device which receives said input video signal and selects whether or not to retransmit said video signal; and means for generating and outputting a weighted average of the video signal into which said text has been inserted and an output of said selection device,... said means comprising a first resistor through which said output of said selection device passes;

a second resistor through which said video signal to which said text has been inserted passes, said first and second resistors being connected in series; and an output terminal formed at a connection point between said first and second resistors.

2. A device according to claim 1, wherein said selection device retransmits said input video signal when said input video signal is a composite video baseband signal or a luminance signal including synchronization.

3. A device according to claim 1, wherein said selection device retransmits said input video signal when said input video signal is a composite video baseband signal in which the chrominance signal thereof is frequency modulated.

4. A device according to claim 1, wherein said input video signal conforms to the PAL, NTSC, or SECAM standard.

5. A device according to claim 1, wherein said character generator inserts luminance signals corresponding to said text into said input video signal.

6. A device according to claim 5, wherein a ratio of a resistance of said second resistor to a resistance of said first resistor is 3:1, for input video signals which conform to said PAL or NTSC standards.

7. A device according to claim 5, wherein a ratio of a resistance to said second resistor to a resistance of said first resistor is 2:1, for input video signals which conform to said SECAM standard.

* * * * *